United States Patent [19]
Kajitani

[11] Patent Number: 4,655,556
[45] Date of Patent: Apr. 7, 1987

[54] LENS SYSTEM FOR OPTICAL DISKS

[75] Inventor: Kazuo Kajitani, Tokyo, Japan

[73] Assignee: Olympus Optical Co., Ltd., Tokyo, Japan

[21] Appl. No.: 742,287

[22] Filed: Jun. 7, 1985

[30] Foreign Application Priority Data

Jun. 15, 1984 [JP] Japan .................. 59-121840

[51] Int. Cl.$^4$ .............................................. G02B 13/18
[52] U.S. Cl. ...................................................... 350/432
[58] Field of Search ......................................... 350/432

[56] References Cited

FOREIGN PATENT DOCUMENTS 58-65009 of 1983 Japan .
58-17409 2/1983 Japan .
58-68711 4/1983 Japan .

Primary Examiner—John K. Corbin
Assistant Examiner—Rebecca D. Gass
Attorney, Agent, or Firm—Cushman, Darby & Cushman

[57] ABSTRACT

A lens system for optical disks comprising a single lens element, one surface of which is suitably formed as an aspherical surface, thereby enabling it to have satisfactorily corrected aberrations and to be light in weight and low in cost.

11 Claims, 7 Drawing Figures

LENS SYSTEM FOR OPTICAL DISKS

BACKGROUND OF THE INVENTION (1) Field of the Invention

The present invention relates to a lens system for optical disks such as for video disks, digitally recorded audio disks, etc..

(2) Description of the Prior Art

A lens system for optical disks requires high resolving power and, therefore, it is necessary for such a lens system to keep spherical and other aberrations to a minimum. It is also necessary for the lens system to be compact and light in weight.

When such a lens system for optical disks is to be arranged by the combination of only spherical lenses, it is necessary to use at least three lenses for correcting aberrations, which adds weight and is undesirable. In order to make a lens system for optical disks light in weight and low in cost, it is desirable for such a lens system to comprise a single lens element. Even with a single lens element, the aberrations could be corrected sufficiently if both the surfaces of the lens element were formed as aspherical ones, but this would naturally involve various technical difficulties in the manufacture thereof.

The lens system disclosed in Japanese Published Unexamined Patent Application No. 17409/83 comprises a single lens element only one surface of which is aspherical and shows well-corrected aberrations. However, for this lens system to satisfy the various conditions which are required of a lens system for optical disks, the lens element must be limited to that having a refractive index in the order of 1.45 to 1.6.

The objective lens system disclosed in Japanese Published Unexamined Patent Application No. 68711/83 also comprises a single lens element having an aspherical surface, but the limitation exists in the selection of lens material.

When the workability of material and other conditions for manufacturing aspherical lenses are taken into consideration, it will not be desirable that the choice of lens material is restricted as is the case in the above mentioned prior art.

SUMMARY OF THE INVENTION

It is, therefore, a primary object of the present invention to provide a lens system for optical disks comprising a single lens element, one surface of which is suitably formed as an aspherical surface, thereby enabling it to have satisfactorily corrected aberrations and to be light in weight and low in cost.

The general capacities required for a lens system for optical disks are that: the focal length should be 4–5 mm for an infinitely distant object point, N.A. be 0.4–0.5, the refractive index and the thickness of the cover glass employed be 1.58 at 800 nm wavelength and 1.2 mm, respectively, the working distance be minimum 2 mm, and the aberrations be corrected to such a degree that root mean square value of the wave aberration from the axis to the off-axis of a half angle of view with 1.245° becomes less than $\lambda/14$.

Because the lens itself is very small in a lens system for optical disks, the workability of material is more important than the weight of material or the unit cost. Therefore, the manufacture with plastics having a low refractive index or the press processing of glass material is suitable for forming aspherical surfaces. However, there are many problems which limit the shape of an aspherical surface or of a spherical surface, thickness, material, etc. which arise from the technical difficulties associated with the workability of material.

The lens system for optical disks according to the present invention can utilize a wide variety of materials, from a low to a high refractive index, and can satisfy the above mentioned requirements even though the lens is a single one with only one surface thereof formed as an aspherical one. It is also to be noted that the asphericity can be applied to a surface having a large radius of curvature because a material having a high refractive index can also be used.

As shown in FIG. 1, the lens system for optical disks according to the present invention comprises a single lens element, and either surface of it is formed as an aspherical one which can be expressed by the following formula:

$$x = \frac{y^2/r}{1 + \sqrt{1 - (1+k)(y/r)^2}} + By^2 + Ey^4 + Fy^6 + Gy^8 + Hy^{10} + Iy^{12} + Jy^{14} + \ldots$$

where x represents the distance from a point on the lens surface to the tangential plane which is tangential to the lens surface at the vertex thereof, y represents the distance from the point to the optical axis, k represents the constant of cone, r represents the standard radius of curvature of the aspherical surface (the radius of curvature of the vertex portion of the aspherical surface), and B, E, F, G, H, I, J, ... respectively represent the 2nd-, 4th-, 6th-, 8th-, 10th-, 12th-, 14th-, ... order coefficients of the aspherical surface.

The lens system for optical disks according to the present invention has the above mentioned form and further satisfies the following conditions (1), (2):

(1) $0.1 < n-2\, r1/f < 0.5$
(2) $0.25 < d/f < 0.75$ where r1 represents the radius of curvature of the first surface (or the standard radius of curvature if the first surface is an aspherical one) which is the object side surface of the lens element, d represents the thickness of the lens element, n represents the refractive index of the lens element, and f represents the focal length of the lens system.

With a single lens and by forming either surface thereof as an aspherical one, it is possible to reduce the axial aberration to substantially zero. However, in order to also correct the off-axial aberrations satisfactorily it is desirable to form both the surfaces thereof as aspherical ones. And, there has been proposed a single lens in which one surface is formed as an aspherical surface and in which the off-axial aberrations are corrected, but this is limited to a lens in which the radius of curvature of the aspherical surface thereof is small. Since the conditions are thus restricted the material having a low refractive index had to be used in order to satisfy the specifications of a lens system for optical disks.

As for the lens system for optical disks according to the present invention, the above mentioned conditions (1) and (2) are satisfied and one surface of a lens element is formed as an aspherical one. Therefore, the lens system according to the present invention satisfies the specifications and capacities of a lens system for optical disks despite the use of ordinary lens material (the refractive index of which is about 1.45–2.0).

In order to correct the off-axial aberrations, it is necessary to correct the sine condition. The correction of the sine condition is affected by the lens shape defined by the radii r1, r2 of curvatures of a single lens element, the thickness d and the refractive index n thereof. Therefore, if the value defined by the condition (1) exceeds either the lower or the upper limit of the condition (1) the sine condition will become unsatisfactory and it will be impossible to correct the off-axial aberrations.

Even when the condition (1) is satisfied, it will be impossible to make the working distance long in case the value d exceeds the upper limit of the condition (2), and it will be impossible to make the thickness at an edge part of the lens large enough in case the value d exceeds the lower limit thereof, these being unsatisfactory whichever the case may be.

When the object side surface of the lens (the first surface) is formed as an aspherical one, it will be possible to reduce the axial aberration to substantially zero. The shape of the sine condition curve depends largely on the shape of the first surface. In order to correct the sine condition and to correct the off-axial aberrations, it is necessary for the radius r1 of curvature of the first surface to satisfy the condition (1). If r1 becomes larger than the upper limit of the condition (1) or smaller than the lower limit thereof, the sine condition will become unsatisfactory and it will be impossible to correct the off-axial aberrations. When the condition (1) is satisfied, the shape of the lens will become convexo-convex in the case of the refractive index being less than 1.75, and meniscus in the case of a higher index.

When the second surface which is the image side surface of the lens element is spherical, the aberrations would become unsatisfactory due to this surface. However, when the thickness of the lens is made large, the rays pass nearer the optical axis and the aberrations become satisfactory. If the value defined by the condition (2) exceeds the upper limit of that condition, it will be impossible to make the working distance long enough. If the value exeeds the lower limit thereof, it will be impossible to make the thickness at an edge part of the lens large enough and to correct the off-axial aberrations satisfactorily. The off-axial aberrations can be corrected more satisfactorily when the lower limit of the condition (2) is set at 0.4, or d is within the limits given below:

$$0.4 < d/f < 0.75$$

The foregoing has described the lens system for optical disks according to the present invention in which the first surface is formed as an aspherical one. Even when the first surface of the lens is formed as a spherical one and the second one is formed as an aspherical one, it still provides the lens system for optical disks which achieves the object of the present invention provided that the above mentioned conditions (1), (2) are satisfied.

When the first surface is formed as a spherical one, the aberrations from this surface will become large, but can be corrected when the second surface is formed as an aspherical one.

When the value defined by the condition (1) exceeds either the upper or the lower limit thereof, the aberrations from the first surface become so great that they cannot be corrected satisfactorily even if the second surface is formed as an aspherical one.

In the case where the aberrations from the first surface are corrected by the second one, the higher from the optical axis the rays pass through the second surface, the better the correction of the aberrations becomes. Therefore, it is desirable that the thickness of the lens does not become so large. If the value defined by the condition (2) exceeds the upper limit of that condition, it will be impossible to make the working distance long enough and to correct the aberrations satisfactorily because the thickness becomes too large. On the other hand, it is more desirable that the upper limit of d is set at 0.4 or d is within the limits given below because it becomes easy to correct the aberrations satisfactorily with the second surface.

$$0.25 < d/f < 0.4$$

When the value exceeds the lower limit of the condition (2), it will be impossible to obtain the desired thickness at an edge part of the lens.

The shape of the first surface or the radius r1 of curvature has much influence on the spherical aberration and the sine condition. Therefore, it will be easier to correct the aberrations if the radius r1 of curvature of the first surface satisfies the following condition (3):

(3) $0.7 < r1/f < 0.85$

The larger the radius r1 of curvature of the first surface becomes, the lesser can be the aberrations from the first surface. However, when the value defined by the condition (3) exceeds the upper limit thereof, the sine condition will become unsatisfactory and the off-axial aberrations will become large, too. And, when the value exceeds the lower limit of the condition (3), both the spherical aberration and the sine condition will become unsatisfactory.

Moreover, it will be desirable to take the refractive index n of the lens element so large that the following condition (4) is satisfied because the radii of the surfaces can then be made larger.

(4) $1.8 < n$

It will be advantageous for the correction of aberrations to make the refractive index n large as shown by the condition (4) because the standard radius of curvature of the second surface then becomes large. It is to be noted that the standard radius of curvature can be made larger if the second surface rather than the first surface is formed as an aspherical one.

DETAILED DESCRIPTION OF THE PREFERRED EMBODIMENTS

Figure 1:
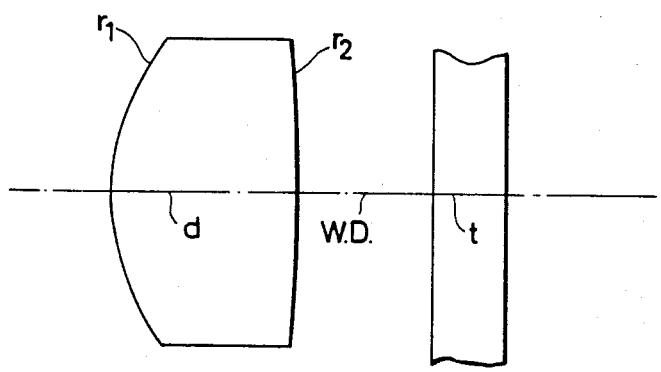
FIG. 1 shows a sectional view of the lens system for optical disks according to the present invention, and FIGS. 2 through 7, respectively, show graphs illustrating aberration curves of Embodiments 1 through 6 of the lens system according to the present invention.
Figure 2:
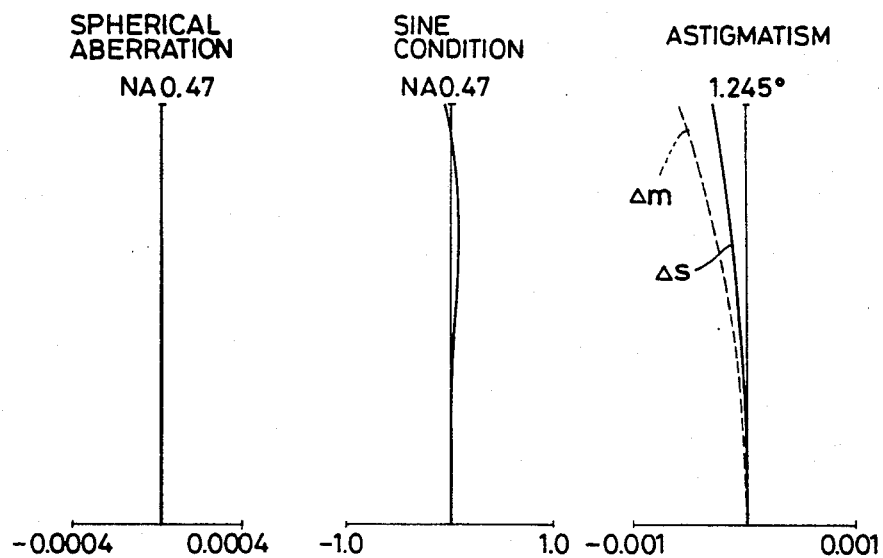
Figure 3:
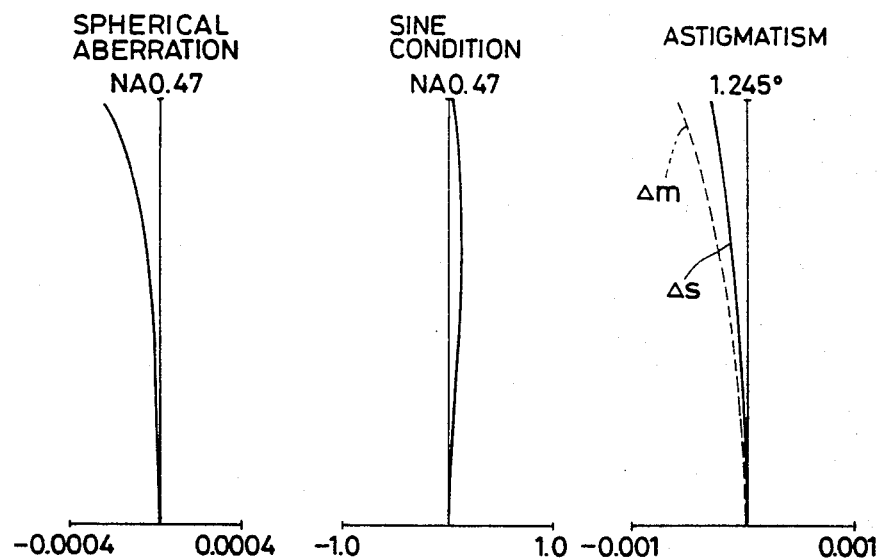
Figure 4:
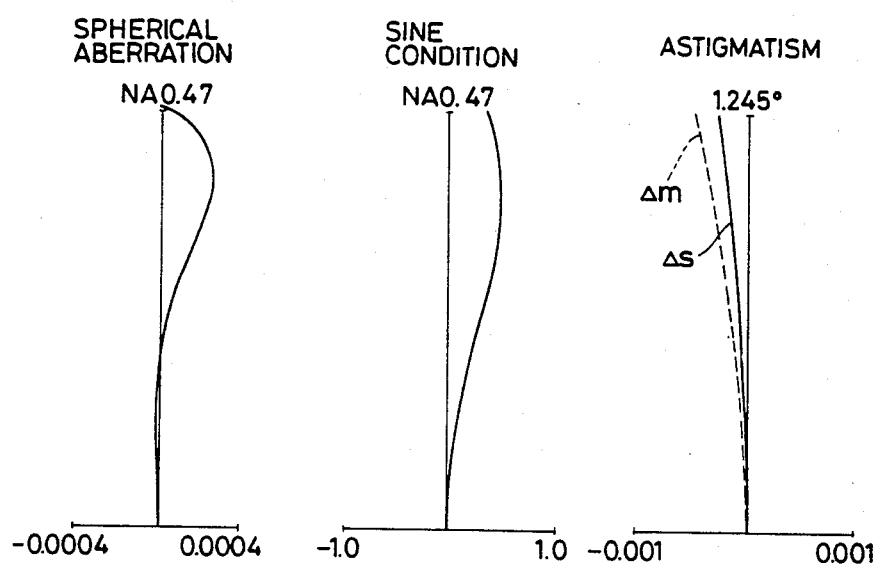
Figure 5:
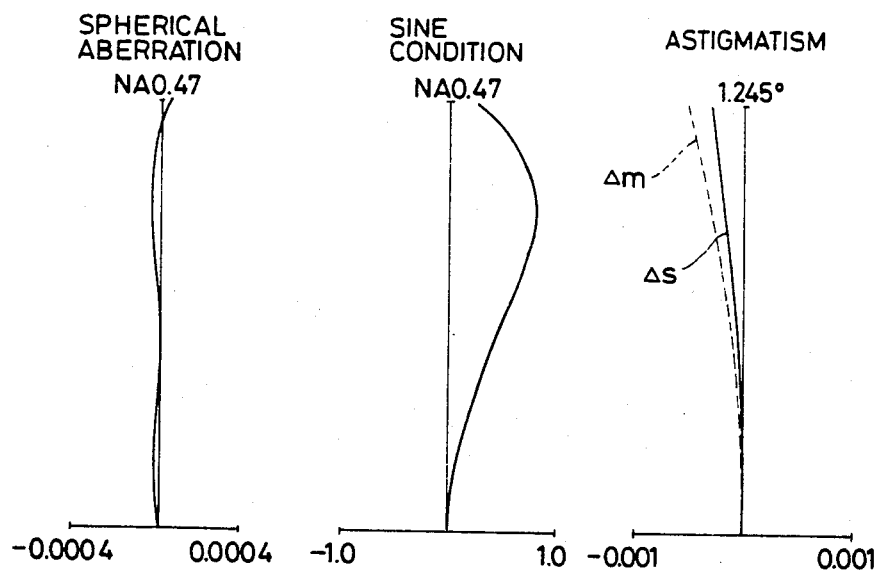
Figure 6:
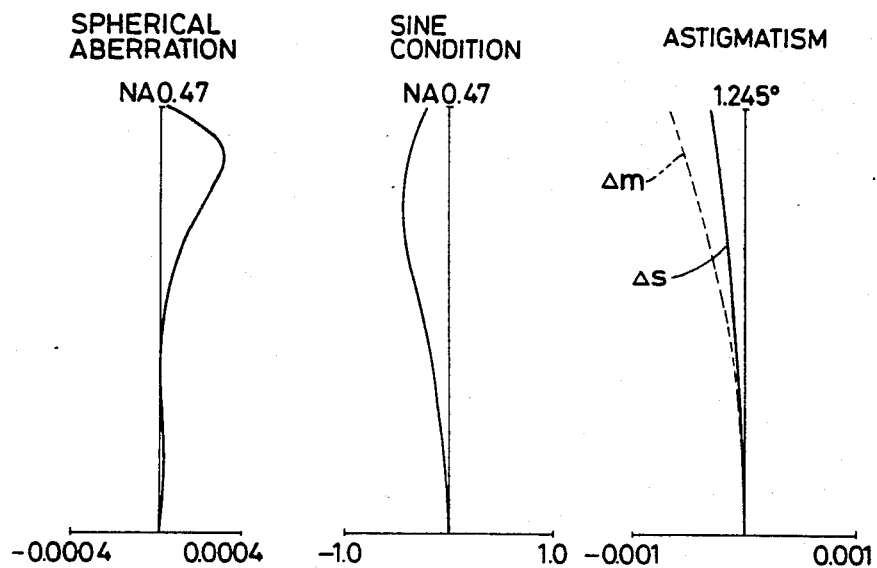
Figure 7:
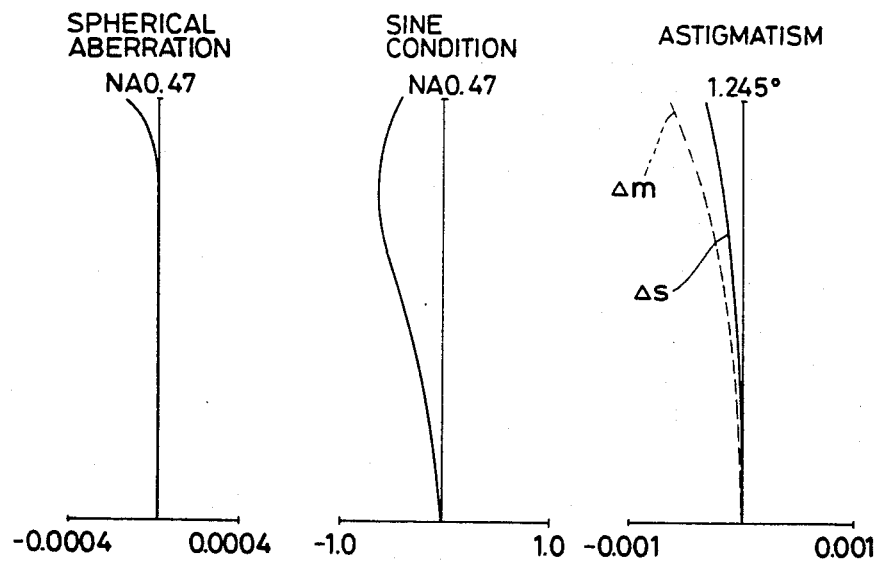

Now, preferred embodiments of the lens system for optical disks according to the present invention as described above are shown below:

| Embodiment 1 | |
| --- | --- |
| r1 = 0.8282 (aspherical) | |
| d = 0.6522   n = 1.89502 | |
| r2 = 6.9675 | |
| f = 1, WD = 0.4632, | t = 0.2609 |
| k = −0.543, B = 0, | E = 0.21273 × $10^{-1}$ |
| F = 0.1284 × $10^{-2}$, | G = −0.59402 × $10^{-2}$ |

Embodiment 1 -continued

| | |
|---|---|
| $H = -0.12514 \times 10^{-1}$, | $I = 0.94836 \times 10^{-9}$ |
| $J = -0.72672 \times 10^{-8}$, | $n - 2\,r1/f \approx 0.24$ |

Embodiment 2

| | |
|---|---|
| $r1 = 0.7586$ (aspherical) | |
| $d = 0.5217$  $n = 1.76825$ | |
| $r2 = 42.1426$ | |
| $f = 1$, $WD = 0.5364$, | $t = 0.2609$ |
| $k = 1.2248$, $B = 0$, | $E = 0.20071$ |
| $F = 0.15674 \times 10^{-1}$, | $G = -0.81498 \times 10^{-2}$ |
| $H = -0.12911 \times 10^{-1}$, | $I = 0.14655 \times 10^{-8}$ |
| $J = 0.53678 \times 10^{-13}$, | $n - 2\,r1/f \approx 0.25$ |

Embodiment 3

| | |
|---|---|
| $r1 = 0.6796$ (aspherical) | |
| $d = 0.5435$  $n = 1.60838$ | |
| $r2 = -4.0499$ | |
| $f = 1$, $WD = 0.5326$, | $t = 0.2609$ |
| $k = 1.678$, $B = 0$, | $E = 0.40592$ |
| $F = -0.23739$, | $G = -0.8318 \times 10^{-2}$ |
| $H = -0.12906 \times 10^{-1}$, | $I = 0.14642 \times 10^{-8}$ |
| $J = 0.53203 \times 10^{-13}$, | $n - 2\,r1/f \approx 0.25$ |

Embodiment 4

| | |
|---|---|
| $r1 = 0.6022$ (aspherical) | |
| $d = 0.5217$  $n = 1.48423$ | |
| $r2 = -1.7734$ | |
| $f = 1$, $WD = 0.5525$, | $t = 0.2609$ |
| $k = 0.2721$, $B = 0$, | $E = -0.30981$ |
| $F = -0.68736$, | $G = -0.80047$ |
| $H = -0.21653 \times 10$, | $I = 0.11728 \times 10^{-7}$ |
| $J = 0.11148 \times 10^{-10}$, | $n - 2\,r1/f \approx 0.28$ |

Embodiment 5

| | |
|---|---|
| $r1 = 0.775$ | |
| $d = 0.2826$  $n = 1.89502$ | |
| $r2 = 4.7846$ (aspherical) | |
| $f = 1$, $WD = 0.66288$, | $t = 0.2609$ |
| $k = 39.1393$, $B = 0$, | $E = 0.2887$ |
| $F = -0.19998$, | $G = 0.35833$ |
| $H = -0.65269$, | $I = 0.18261 \times 10^{-1}$ |
| $J = 0.21333 \times 10^{-3}$, | $n - 2\,r1/f \approx 0.35$ |

Embodiment 6

| | |
|---|---|
| $r1 = 0.7578$ | |
| $d = 0.2826$  $n = 1.82199$ | |
| $r2 = 8.0779$ (aspherical) | |
| $f = 1$, $WD = 0.6668$, | $t = 0.2609$ |
| $k = -151.7316$, $B = 0$, | $E = 0.25648$ |
| $F = -0.278$, | $G = 0.31784$ |
| $H = -0.65269$, | $I = 0.18261 \times 10^{-1}$ |
| $J = 0.21333 \times 10^{-3}$, | $n - 2\,r1/f \approx 0.31$ | where r1 and r2 respectively represent either the radius (in the case of a spherical surface) or the standard radius (in the case of an aspherical surface) of curvature of the respective surfaces of the lens element, d represents the thickness of the lens element, n represents the refractive index of the lens element at 800 nm wavelength, f represents the focal length of the lens system, WD represents the working distance, t represents the thickness of a cover glass, k represents the constant of cone, and B, E, F, G, H, I and J respectively represent the 2nd-, 4th-, 6th-, 8th-, 10th-, 12th- and 14th-order coefficients of the aspherical surface which is expressed by the above mentioned formula.

The lens system for optical disks according to the present invention comprises a single lens element the aberrations of which are satisfactorily corrected, and satisfies the requirements of a lens system for optical disks. This lens system is lighter in weight, lower in cost and easier to manufacture compared with the known lens system which is arranged by the combination of only spherical lenses or arranged by a single lens element both the surfaces of which are formed as aspherical ones. Especially, since it is possible to select lens material from materials having a wide variety of the refractive indices, the material having good workability can be selected. When the material the refractive index of which is at least 1.8 is selected, the degree of freedom in design and manufacture of the lens system can be increased, for example, it will be possible to make the standard radius of curvature of an aspherical surface large.

I claim:

1. A lens system for optical disks comprising a single lens element, one surface of said lens element being formed as an aspherical one expressed by the formula shown below wherein the standard radius of curvature of said surface is r, the distance from a point on the lens surface to the tangential plane which is tangential to said surface at the vertex thereof is x, and the distance from said point to the optical axis is y, said lens system being arranged to satisfy the conditions (1) and (2) shown below:

$$x = \frac{y^2/r}{1 + \sqrt{1 - (1+k)(y/r)^2}} +$$

$$By^2 + Ey^4 + Fy^6 + Gy^8 + Hy^{10} + Iy^{12} + Jy^{14} + \ldots$$

(1) $0.1 < n - 2\,r1/f < 0.5$
(2) $0.25 < d/f < 0.75$ where B, E, F, G, H, I, J, ... respectively represent the 2nd-, 4th-, 6th-, 8th-, 10th-, 12th-, 14th-, ... order coefficients of the aspherical surface, k represents the constant of cone, r1 represents the radius of curvature of the first surface (the standard radius of curvature thereof if aspherical), d represents the thickness of said lens element, n represents the refractive index of said lens element, and f represents the focal length of said lens system.

2. A lens system for optical disks according to claim 1, the first surface of said lens element being aspherical and the second surface thereof being spherical.

3. A lens system for optical disks according to claim 2, wherein said lens system for optical disks has the following numerical data:

| | |
|---|---|
| $r1 = 0.8282$ (aspherical) | |
| $d = 0.6522$  $n = 1.89502$ | |
| $r2 = 6.9675$ | |
| $f = 1$, $WD = 0.4632$, | $t = 0.2609$ |
| $k = -0.543$, $B = 0$, | $E = 0.21273 \times 10^{-1}$ |
| $F = 0.1284 \times 10^{-2}$, | $G = -0.59402 \times 10^{-2}$ |
| $H = -0.12514 \times 10^{-1}$, | $I = 0.94836 \times 10^{-9}$ |
| $J = -0.72672 \times 10^{-8}$, | $n - 2\,r1/f \approx 0.24$ | where r1 represents the standard radius of curvature of the first surface, r2 represents the radius of curvature of the second surface, n represents the refractive index of said lens element at 800 nm wavelength, WD represents the working distance, and t represents the thickness of a cover glass.

4. A lens system for optical disks according to claim 2, wherein said lens system for optical disks has the following numerical data:

| | |
|---|---|
| r1 = 0.7586 (aspherical) | |
| d = 0.5217  n = 1.76825 | |
| r2 = 42.1426 | |
| f = 1, WD = 0.5364, | t = 0.2609 |
| k = 1.2248, B = 0, | E = 0.20071 |
| F = 0.15674 × $10^{-1}$, | G = −0.81498 × $10^{-2}$ |
| H = −0.12911 × $10^{-1}$, | I = 0.14655 × $10^{-8}$ |
| J = 0.53678 × $10^{-13}$, | n − 2 r1/f ≈ 0.25 | where r1 represents the standard radius of curvature of the first surface, r2 represents the radius of curvature of the second surface, n represents the refractive index of said lens element at 800 nm wavelength, WD represents the working distance, and t represents the thickness of a cover glass.

5. A lens system for optical disks according to claim 2, wherein said lens system for optical disks has the following numerical data:

| | |
|---|---|
| r1 = 0.6796 (aspherical) | |
| d = 0.5435  n = 1.60838 | |
| r2 = −4.0499 | |
| f = 1, WD = 0.5326, | t = 0.2609 |
| k = 1.678, B = 0, | E = 0.40592 |
| F = −0.23739, | G = −0.8318 × $10^{-2}$ |
| H = −0.12906 × $10^{-1}$, | I = 0.14642 × $10^{-8}$ |
| J = 0.53203 × $10^{-13}$, | n − 2 r1/f ≈ 0.25 | where r1 represents the standard radius of curvature of the first surface, r2 represents the radius of curvature of the second surface, n represents the refractive index of said lens element at 800 nm wavelength, WD represents the working distance, and t represents the thickness of a cover glass.

6. A lens system for optical disks according to claim 2, wherein said lens system for optical disks has the following numerical data:

| | |
|---|---|
| r1 = 0.6022 (aspherical) | |
| d = 0.5217  n = 1.48423 | |
| r2 = −1.7734 | |
| f = 1, WD = 0.5525, | t = 0.2609 |
| k = 0.2721, B = 0, | E = −0.30981 |
| F = −0.68736, | G = −0.80047 |
| H = −0.21653 × 10, | I = 0.11728 × $10^{-7}$ |
| J = 0.11148 × $10^{-10}$, | n − 2 r1/f ≈ 0.28 | where r1 represents the standard radius of curvature of the first surface, r2 represents the radius of curvature of the second surface, n represents the refractive index of said lens element at 800 nm wavelength, WD represents the working distance, and t represents the thickness of a cover glass.

7. A lens system for optical disks according to claim 1, the first surface of said lens element being spherical and the second surface thereof being aspherical.

8. A lens system for optical disks according to claim 7, further satisfying the condition (3) shown below:
(3) 0.7 < r1/f < 0.85

9. A lens for optical disks according to claim 8, further satisfying the condition (4) shown below:
(4) 1.8 < n 10. A lens system for optical disks according to claim 9, wherein said lens system for optical disks has the following numerical data:

| | |
|---|---|
| r1 = 0.775 | |
| d = 0.2826  n = 1.89502 | |
| r2 = 4.7846 (aspherical) | |
| f = 1, WD = 0.66288, | t = 0.2609 |
| k = 39.1393, B = 0, | E = 0.2887 |
| F = −0.19998, | G = 0.35833 |
| H = −0.65269, | I = 0.18261 × $10^{-1}$ |
| J = 0.21333 × $10^{-3}$, | n − 2 r1/f ≈ 0.35 | where r1 represents the radius of curvature of the first surface, r2 represents the standard radius of curvature of the second surface, n represents the refractive index of said lens element at 800 nm wavelength, WD represents the working distance, and t represents the thickness of a cover glass.

11. A lens system for optical disks according to claim 9, wherein said lens system for optical disks has the following numerical data:

| | |
|---|---|
| r1 = 0.7578 | |
| d = 0.2826  n = 1.82199 | |
| r2 = 8.0779 (aspherical) | |
| f = 1, WD = 0.6668, | t = 0.2609 |
| k = −151.7316, B = 0, | E = 0.25648 |
| F = −0.278, | G = 0.31784 |
| H = −0.65269, | I = 0.18261 × $10^{-1}$ |
| J = 0.21333 × $10^{-3}$, | n − 2 r1/f ≈ 0.31 | where r1 represents the radius of curvature of the first surface, r2 represents the standard radius of curvature of the second surface, n represents the refractive index of said lens element at 800 nm wavelength, WD represents the working distance, and t represents the thickness of a cover glass.

* * * * *